Nov. 20, 1956 D. W. LYNCH 2,771,552

DISCRIMINATING DETECTOR

Filed May 9, 1951

INVENTOR
DONALD W. LYNCH

BY D. C. Snyder
Howard White
ATTORNEYS

United States Patent Office 2,771,552

Patented Nov. 20, 1956

2,771,552

DISCRIMINATING DETECTOR

Donald W. Lynch, Washington, D. C.

Application May 9, 1951, Serial No. 225,437

3 Claims. (Cl. 250—27)

(Granted under Title 35, U. S. Code (1952), sec. 266)

This invention relates to a discriminating second detector which will greatly improve the adjacent or off-channel signal rejection characteristics of a radio receiver for pulse-modulated, or modulated C. W. signals.

In general the frequency band allocated to any particular radio application is limited, making it desirable, and in some cases necessary, to use the allocated band efficiently. This efficiency with which the allocated band can be used with a multichannel system is partially determined by the amount of adjacent-channel signal rejection that can be obtained at the receiver, since this controls the channel-spacing and thus determines the total number of channels of a given width that can be placed in the allotted frequency band. Therefore, the unused space between channels, necessary to obtain the required amount of adjacent-channel rejection, should be reduced to as small a minimum as possible.

In pulse-modulated systems employing rectangular pulses of short duration, in the order of 1 microsecond or less, the adjacent-channel rejection is a serious problem due to the wide range of frequency components which comprise the pulse signals. The novel discriminating detector circuit solves this problem by providing the receiver with means to discriminate against the sidebands of the off-frequency signals.

It is an object of this invention to provide a novel second detector circuit for radio receivers which will allow the frequency band allocated for any particular application to be used more efficiently than heretofore known.

It is a further object of this invention to provide a novel second detector circuit for radio receivers which will allow the unused space between adjacent frequency channels of a multichannel system to be reduced to a minimum consistent with the requirements of the system. This improvement allows a receiver to handle many more frequency channels than it could heretofore be capable of handling.

Another object of this invention is to provide a discriminating second detector circuit in a radio receiver which will allow the receiver to sharply discriminate between a plurality of frequency bands closely spaced and being transmitted by several different transmitters.

Referring now to the drawing wherein a preferred embodiment of the novel detector circuit is shown and similar reference numerals refer to similar parts in the various figures.

Figure 1:
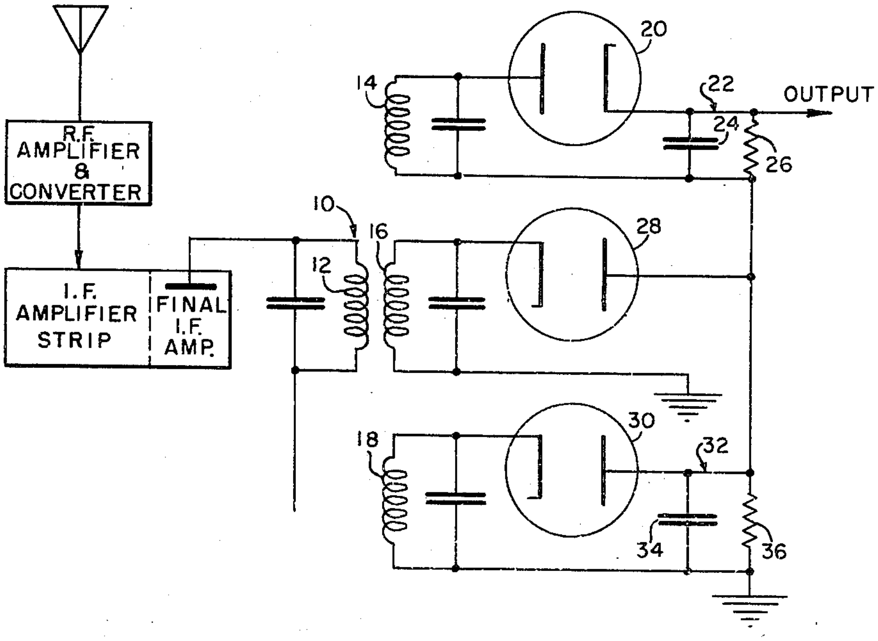
Figure 1 is a schematic circuit diagram of the novel discriminating detector circuit of the present invention as positioned in a conventional radio receiver.

The novel discriminating detector constructed in accordance with the present invention is intended for use in a conventional radio receiver. The detector would be preceded, as shown in Figure 1, by an antenna, and R. F. amplifier and convertor, an I. F. amplifier strip, and a final I. F. amplifier. Since each of these elements are found in all conventional receivers and are well known, no further description of them is thought to be necessary.

The invention, in broad aspect, contemplates a detector circuit having a first broad banded detector channel tuned to the center of the I. F. passband and operative to provide demodulated output signals of one polarity, second and third relatively narrow banded detector channels having center frequencies, respectively, tuned to the high and low ends of the passband of the first channel and operative to deliver demodulated output signals of a polarity opposite to the polarity of the output signals delivered by the first channel, and means to combine the demodulated outputs of all of the channels.

In the preferred embodiment of the invention the detector here described is coupled to the final I. F. amplifier by a transformer 10 having a primary winding 12 and three secondaries 14, 16 and 18. Primary 12 is tuned to the center of the I. F. passband and is adjusted to have a bandwidth equal to that of the I. F. amplifier preceding it. Secondary 14 is also tuned to the center of the I. F. passband but for reasons soon to become apparent has a bandwidth somewhat less than that of primary 12.

Secondary 16 is tuned so that its center frequency falls at the low end of the passband of secondary 14 and is so designed as to have a bandwidth less than one half that of secondary 14. Conversely secondary 18 is tuned so that its center frequency falls at the high end of the bandpass of secondary 14 and is also designed to have a bandpass less than one half secondary 14.

The transformer 10 is designed to minimize the coupling between secondaries 14, 16 and 18 while the coupling between the primary and the secondaries is adjusted for optimum energy transfer. For most practical pulse widths and bandwidths, secondary 14 is preferably coupled more closely to the primary 12 than secondaries 16 and 18. Secondaries 16 and 18 have approximately equal coupling to the primary 12.

The output of secondary 14 is detected by the diode 20 and appears across the filter 22, which consists of capacitor 24 and resistance 26. The outputs of secondaries 16 and 18 are detected by diodes 28 and 30, which share a common filter 32 consisting of capacitor 34 and resistance 36. The filters 22 and 32 are connected in series so that the resulting video output is the algebraic sum of the voltages appearing across the separate filters 22 and 32. It should be noted that the diode 20 is connected to deliver output signals of one polarity and diodes 28 and 30 are connected to deliver output signals of the opposite polarity.

Figure 2:
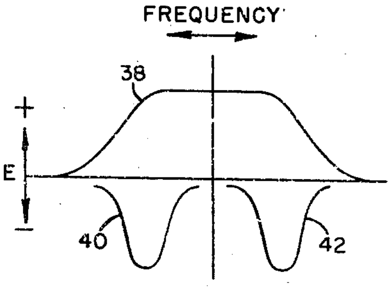
Figure 2 is a plot of the individual band pass characteristics of several detector channels of the present invention.

Figure 2 clearly shows the individual output waveforms of each of the secondaries. When a frequency-modulated C. W. signal is fed into the I. F. amplifier the positive output would be detected by diode 20 and appear across filter 22. It would appear as waveform or demodulated output 38 on an oscilloscope. The amplitude of this waveform or output, as shown in Figure 2, is plotted against frequency. Waveform or output 40 would be the negative output detected by diode 28 and it would appear across the common filter 32. Waveform or demodulated output 42 would be the output detected by diode 30 and it also would appear across the common filter 32. Outputs 40 and 42 are negative, while output 38 is positive, due to the particular polarity of diodes 20, 28 and 30.

Figure 3:
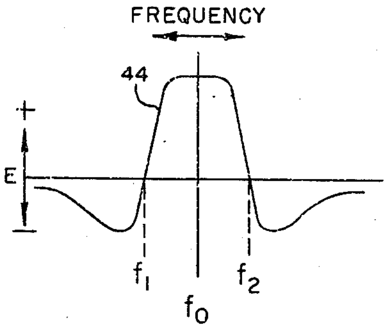
Figure 3 is a plot of the resultant bandpass characteristic of the present invention.

Figure 3 is the resultant output 44 which is achieved by algebraically adding the positive output 38 with the negative outputs 40 and 42 due to the fact that filters 22 and 32 are connected in series. It can be seen from Figure 3 that for all frequencies within the passband the output is positive and for all frequencies just outside the passband the output is negative. For those frequencies which are still further away from the passband, the output would be zero. It is of course contemplated where the negative output is detrimental, a unilateral or clipping circuit could be employed in the circuits following the discriminating detector to eliminate the undesired portion of the output.

The operation of the detector with pulsed signals is similar to that of C. W. operation, being complicated only by the broad frequency-spectrum of the pulsed signal. When the center frequency of a received pulse falls within the resultant passband of the discriminating detector, the rejecting voltage appearing across the common filter 32 is low, and the detector operates in the same manner as a conventional detector. When, however, the center frequency of a received pulse is either above or below the passband of the discriminating detector, the ratio of the rejecting voltage appearing across the common filter 32 to the voltage appearing across filter 22 is increased. With the proper selection of circuit parameters, the resulting output will be approximately the same as a conventional detector for signals with center frequencies in the passband, and will be zero or negative for signals with frequencies outside the passband. As in the case of C. W. operation, a clipping circuit may be used to eliminate negative output, if this is desired.

By the use of the novel discriminating detector, it can be seen that the slope of skirts of the signal curve are sharply increased, and that even the skirts of the signal curve can be made negative. This is, of course, accompanied by a minor reduction in bandwidth which can be compensated to give the desired resultant bandwidth by adjusting the bandwidths of the secondaries. Further this sharp discrimination is obtained with very little sacrifice to loss of gain in the passband due to cancellation in the detector circuits.

From the foregoing description of the present invention it is apparent that considerable modification of the features thereof is possible without exceeding the scope of the invention which is defined in the appended claims.

The invention described herein may be manufactured and used by or for the Government of the United States of America for governmental purposes without the payment of any royalties thereon or therefor.

What is claimed is:

1. A detector circuit comprising in combination, a first detector channel operative to provide demodulated output signals of one polarity, second and third detector channels operative to provide demodulated output signals of a polarity opposite to the polarity of the output of said first detector channel, each of said detector channels having a predetermined bandpass; said second and third detector channels having bandpass center frequencies within the bandpass of said first detector channel and at the high and low ends thereof respectively, the bandpass of each of said second and third detector channels being less than one half the bandpass of said first detector channel, and means combining the outputs of said detector channels whereby the resultant demodulated output of all of said channels is the algebraic sum of the individual outputs of said detector channels.

2. A detector circuit comprising in combination, a first detector channel operative to provide demoduated output signals of one polarity, second and third detector channels having separate detecting diodes and a common output filter; said second and third detector channels being operative to provide demoduated output signals of a polarity opposite to the polarity of the output of said first detector channel, each of said detector channels having a predetermined bandpass; said second and third detector channels having bandpass center frequencies within the bandpass of said first detector channel and at the high and low ends thereof respectively, the bandpass of each of said second and third detector channels being less than one half the bandapss of said first detector channel, and means combining the outputs of said detector channels whereby the resultant demoduated output of all of said channels is the algebraic sum of the individual outputs of said detector channels.

3. A detector circuit comprising in combination, a first detector channel having a detecting diode and a filter; said first detector channel being operative to provide demodulated output signals of one polarity, second and third detector channels having separate diodes and a common output filter; said second and third detector channels being operative to provide demodulated output signals of a polarity opposite to the polarity of the output of said first detector channel, each of said detector channels having a predetermined bandpass; said second and third detector channels having bandpass center frequencies within the bandpass of said first detector channel and at the high and low ends thereof respectively, the bandpass of each of said second and third detector channels being less than one half the bandpass of said first detector channel, and means combining the outputs of said detector channels whereby the resultant demoduated output of all of said channels is the algebraic sum of the individual outputs of said detector channels.

References Cited in the file of this patent

UNITED STATES PATENTS

| | | |
|---|---|---|
| 1,733,414 | Knapp | Oct. 29, 1929 |
| 2,116,814 | Wilbur | May 10, 1938 |
| 2,227,415 | Wolff | Dec. 31, 1940 |
| 2,256,078 | Crosby et al. | Sept. 16, 1941 |
| 2,402,083 | Reid | June 11, 1946 |
| 2,429,762 | Koch | Oct. 28, 1947 |
| 2,456,915 | Carlson | Dec. 21, 1948 |
| 2,504,341 | Mathews | Apr. 18, 1950 |
| 2,513,803 | Kahn | July 4, 1950 |
| 2,589,236 | Earp | Mar. 18, 1952 |

FOREIGN PATENTS

| | | |
|---|---|---|
| 465,525 | Canada | May 30, 1950 |